Figure 1:
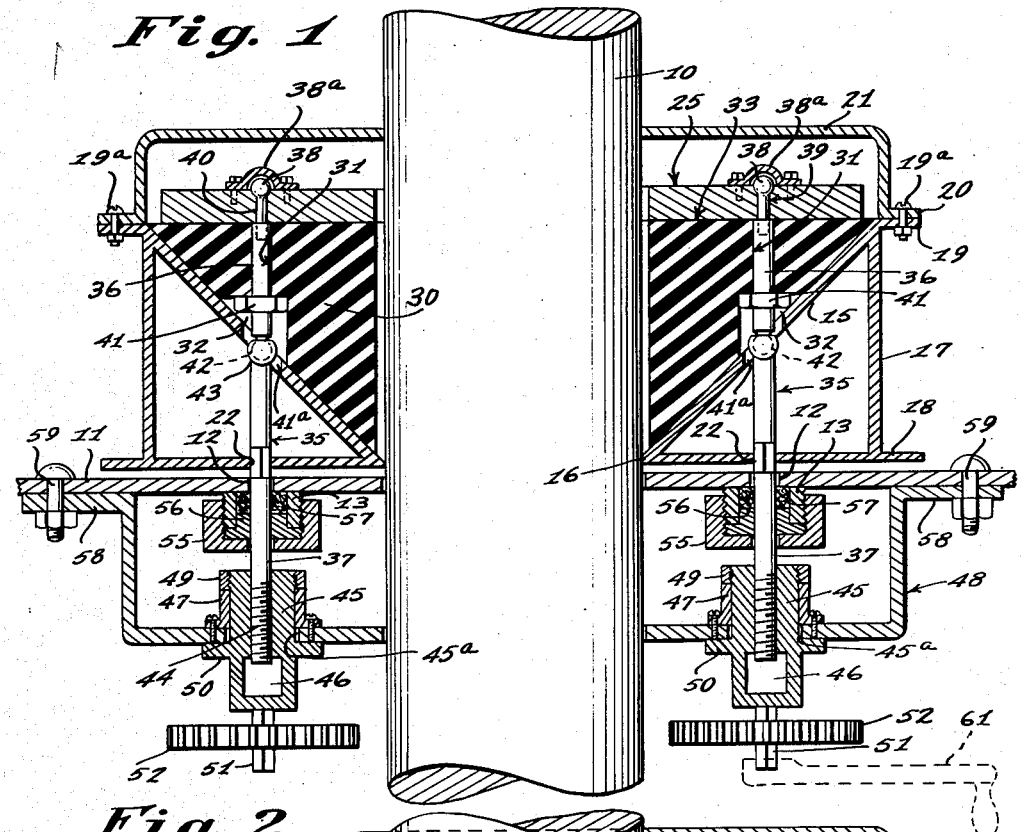

Aug. 15, 1950 — J. A. EARLY — 2,518,980
EMERGENCY PACKING
Filed April 6, 1948 — 2 Sheets-Sheet 1

INVENTOR.
JAMES A. EARLY
BY McMorrow, Berman & Davidson
ATTORNEYS

Aug. 15, 1950   J. A. EARLY   2,518,980
EMERGENCY PACKING
Filed April 6, 1948   2 Sheets-Sheet 2

INVENTOR.
JAMES A. EARLY
BY
McMorrow, Berman & Davidson
ATTORNEYS

Patented Aug. 15, 1950

2,518,980

UNITED STATES PATENT OFFICE 2,518,980

EMERGENCY PACKING

James A. Early, San Pedro, Calif., assignor of one-half to James H. Early and Cecil Early, both of Los Angeles, Calif., jointly Application April 6, 1948, Serial No. 19,343

3 Claims. (Cl. 286—31)

This invention relates to an emergency packing.

An object of the invention is the provision of an emergency packing head which may be applied readily to shafts employed in ships while at sea as a temporary measure to supplement a leaking packing so that a ship may continue to a port, the packing head including a conically shaped stuffing box for the reception of conical packing with a plurality of rods passing through the packing and box, one end of each rod being swiveled in a section of a ring at the broad outer face of the packing and at one side of a bulkhead, the other ends of the rods being threaded into nuts which are rotated simultaneously at the other side of the bulkhead for compressing the packing in the box, the shaft passing axially of the packing and stuffing box.

A further object of the invention is the provision of an emergency packing head for shafts on ships while at sea, said packing head being applied to a shaft at one side of a bulkhead with means at the other side of the bulkhead for drawing the packing in sealed relation on the shaft, the packing including a conical stuffing box for the reception of a conical packing, a ring adapted to compress the packing in the box by the drawing means including a plurality of nuts and rods which are arranged circumferentially about the shaft with the rods passing through the packing and the box, the rods at one end having connections with the ring while the other ends of said rod being threaded into the nuts, means being employed at the other side of the bulkhead for rotating the nuts in synchronism so that the ring will apply a uniform pressure to all parts of the packing.

This invention will be best understood from a consideration of the following detailed description, in view of the accompanying drawings forming part of the specification, nevertheless it is to be understood that the invention is not confined to the disclosure, being susceptible of such changes and modifications which shall define no material departure from the salient features of the invention as expressed in the appended claims.

Figure 2:
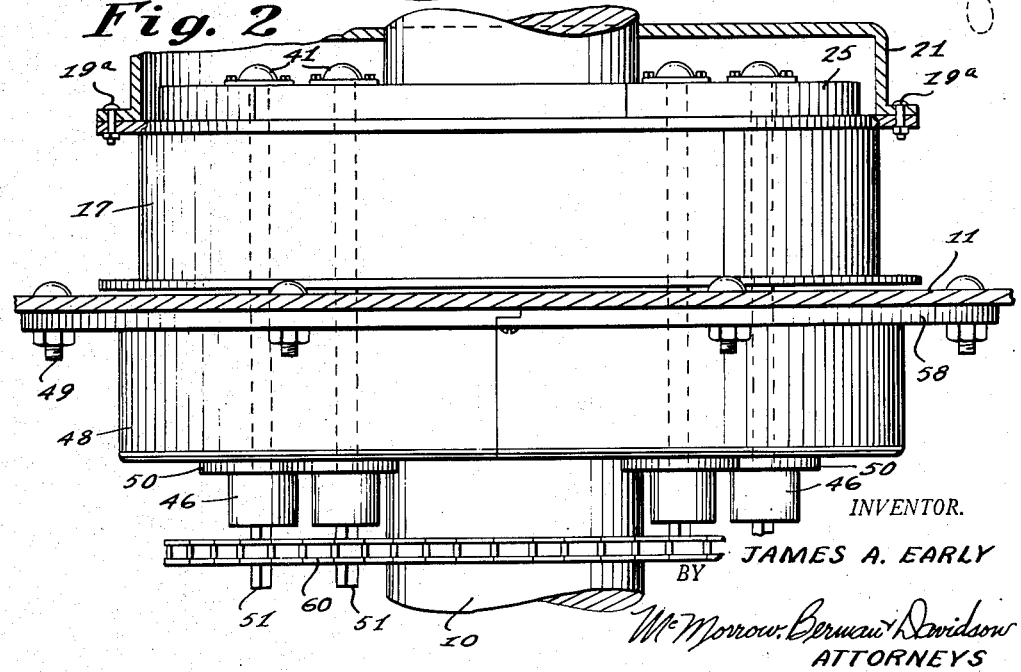
Figure 3:
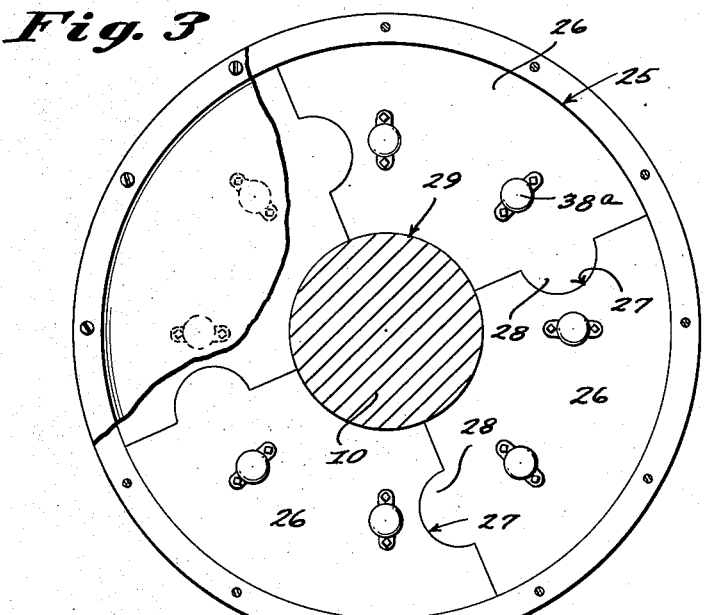
Figure 4:
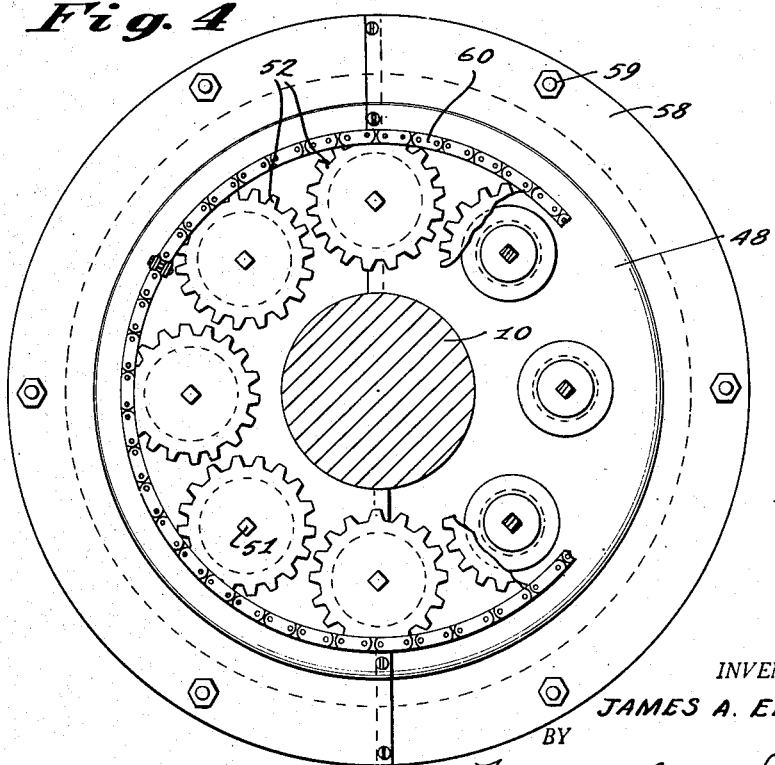

In the drawings:

Figure 1 is a longitudinal horizontal section of my packing head applied to a shaft and in association with the bulkhead of a ship, Figure 2 is a top plan view of the packing head, Figure 3 is an end view of the packing head with a portion of a sectional packing ring broken away and with an end cover plate removed, and Figure 4 is an end view which is opposite to that illustrated in Figure 3 with parts in section and disclosing the operating means for drawing the packing in sealed relation with a shaft.

Referring more particularly to the drawings 10 designates a shaft on a ship passing through a bulkhead 11. Before my packing head is applied to the shaft, said bulkhead must be supplied with a plurality of circumferentially arranged passages 12. Externally threaded nipples 13 must be secured in any approved manner to one face of the bulkhead in embracing relation with the passages 12.

The packing head includes a conically shaped stuffing box 15 having a passage 16 at its reduced end to receive the shaft 10. A cylindrical wall 17 and an end plate 18 are formed integrally with the stuffing box. The passage 16 is disposed centrally of the plate 18. The wider end of the box 15 has a peripheral flange 19 which is bolted at 19a to a flange 20 on a cup-shaped cover 21. The plate 18 has a plurality of circumferentially arranged passages 22 in line with the similarly arranged passages 12 in the bulkhead.

A ring 25 is formed of arcuate segments 26 provided with a semi-circular notch 27 at one end and a semi-circular projection 28 at the other end. The ring, when the segments are coordinated provides a central opening 29 for the reception of the shaft 10.

A conically shaped packing 30 which may be formed of rubber or any well-known packing materials is seated in the box 15. This packing is provided with a plurality of circumferentially arranged passages 31 aligning with the passages 22 in the plate 18 and terminating at the inner ends in pockets 32. The ring 25 is in engagement with the broader flat outer end 33 of the packing 30.

A rod generally designated by the numeral 35 is received by each of the passages 31 in the packing 30 and by the passages 12 and 22 in the respective bulkhead 11 and the plate 18. These rods also pass through the aligned pockets 32. Each rod is formed of two sections 36 and 37. The section 36 has a ball 38 at its outer end mounted in a socket at the outer end of a passage 39 in the ring 25. A pin 40 carries the ball 38 and is mounted in the outer end of the section 36 of each rod. A curved cap 38a secured to the outer face of the ring retains the ball in position. It will be noted that each segment 26 of the ring 25 (Figure 3) has two passages 39 for a pair of the sections 36 of the rods. The inner end of each section 36 of a rod 35 has a nut or flange 41 seated in an associated pocket 32 of the packing 30 and in engagement with the bottom of said pocket. A ball 42 is carried by the inner end of the section 36 of each rod 35. A plurality of openings 41a are formed in the box 15 to receive the rods 35.

The other section 37 of each rod has a socket 43 receiving the ball 42 and extends through the passages 22 and in the plate 18 and the bulkhead 11 respectively. The extreme inner ends of the sections 37 are threaded at 44 into nuts 45 which are rotatably mounted in circumferentially arranged opening 45a in the cover 48.

Each nut has a hollow boss 46 at its outer end to permit the threaded end of the section 37 to move thereinto. Sleeves 47 secured to the inner face of a cup-shaped closure 48 which is formed of two sections receive the inner ends of the nuts and a nut 49 threaded onto the inner end of each nut 45 cooperates with a flange 50 for retaining the nuts 45 against longitudinal movement relative to the sections 37. A shaft 51 square in cross-section is received by a square opening in a gear 52.

A cap 55 is threaded onto each nipple 13 and forces a gland 56 against a packing 57. This packing surrounds each section 37 of the rods 35 and prevents the escape of fluids through the openings 12 in the bulkhead 11. The closure 48 has a peripheral flange 58. This flange and bulkhead are bored at spaced points to provide openings to receive bolts 59.

A chain 60 is trained on the circumferentially arranged gears 52. A crank 61 is employed for rotating any one of the squared shafts 51 for causing simultaneous rotation of all of the gears and the nuts 45 for creating a pull on the rods 35 for causing the ring 25 to compress the packing 30 in the box 15.

With the parts in position as shown in Figure 1 after the packing head has been applied to the shaft 10 at the bulkhead 11, the crank 61 may be applied to one of the shafts 51 and rotated in the proper direction for compressing the packing 20 snugly against the shaft. If it be desired to release some of pressure on the packing the crank is revolved in the opposite direction so that the combination rod 35 will be forced outwardly whereby the nuts or flanges 41 will back the packing 30 away from the shaft until the excess pressure has been relieved.

What I claim is:

1. An emergency packing for shafts on ships comprising a conically shaped stuffing box, a cone shaped packing in the box and provided with a plurality of circumferentially arranged passages terminating at the inner ends thereof in pockets, said box and packing having aligned passages to receive a shaft a ring surrounding the shaft and engaging the broad end of the packing, a rod extending through each of the circumferentially arranged passages, and having one end provided with means for fixedly seating in said ring, a flange fixedly carried by each of said rods and seated in the pocket adjacent thereto, the other end of each of said rods being movably supported exteriorly of said stuffing box, and actuating means operatively connected to said movably supported ends of said rods for causing the rods upon operation of said actuating means to exert a pull on the ring to thereby apply pressure on the packing and upon reverse operation of said actuating means to release the pull on the ring to thereby relieve the pressure on the packing.

2. An emergency packing for shafts on ships comprising a conically shaped stuffing box, a cone shaped packing in the box and provided with a plurality of circumferentially arranged passages terminating at the inner ends thereof in pockets, said box and packing having aligned passages to receive a shaft a ring surrounding the shaft and engaging the broad end of the packing, a rod extending through each of the circumferentially arranged passages, and having one end provided with means for fixedly seating in said ring, a flange secured to each rod and seated in the pocket adjacent thereto, a nut threaded on the other end of each of said rods, and means operatively connected to said nuts for rotating the nuts simultaneously in one direction to exert a pull on the ring to thereby compress the packing in the box and on the shaft and for rotating the nut simultaneously in the opposite direction to release the pull on the ring to thereby relieve the compressing of the packing in the box and on the shaft.

3. In a ship having a bulkhead provided with a passage to receive a shaft, an emergency packing for the shaft at the bulkhead comprising a cup shaped cover secured to one face of the bulkhead, a stuffing box embracing the shaft at the other face of the bulkhead, a packing in the box, a ring seated upon one end face of the packing, a plurality of circumferentially arranged rods passing through the stuffing box and packing and having one end connected to the ring, said bulkhead being provided with passages through which the rods extend, the cover having openings in line with the rods, a nut rotatably mounted in each opening and having a threaded engagement with the other end of an adjacently disposed rod, the stuffing box, packing and the cover having aligned axial passages to receive the shaft, the nuts being circumferentially arranged around the shaft, a flange on each rod in contact with the other end face of the packing, and means for revolving the nuts in one direction simultaneously for causing the rods to exert a pull on the ring to compress the packing and for rotating the nuts simultaneously in the opposite direction to release the pull on the ring to thereby relieve the compressing of the packing.

JAMES A. EARLY.

REFERENCES CITED

The following references are of record in the file of this patent:

UNITED STATES PATENTS

| Number | Name | Date |
|---|---|---|
| 463,053 | Houston | Nov. 10, 1891 |
| 1,872,105 | Black | Aug. 16, 1932 |